Patented Oct. 31, 1944

2,361,515

UNITED STATES PATENT OFFICE 2,361,515

DULL COATING COMPOSITIONS

William A. Weidlich, East Bound Brook, N. J., assignor to Interchemical Corporation, New York, N. Y., a corporation of Ohio No Drawing. Application May 27, 1941,
Serial No. 395,389

3 Claims. (Cl. 106—192)

This invention relates to flatting agents for use in the preparation of dull coating compositions, and to the compositions and finished articles containing said flatting agents. More particularly, it is directed to the use of certain calcium silicates as flatting agents for coating compositions.

While many protective and decorative finishes are glossy, it is often desired to obtain finishes which are more or less matte, either for the decorative effect (as in furniture finishes) or for the utilitarian effect (as in finishes for photographic devices, where a flat surface is essential). Such an effect can be obtained by the use of very high percentages of pigment (e. g.—flat wall paints, automobile undercoaters); but it is often desirable to get the same effect without loading the film with pigment, either because the film properties of a lightly pigmented finish are desired, or because a transparent finish is desired.

To obtain this effect, the coating composition may be designed with a lack of balance between the various film-forming ingredients and solvents, so that a portion of the film is precipitated in the balance of the film. A very satisfactory flatting effect may be obtained in this fashion; by careful compounding with certain classes of ingredients, exceedingly tough, transparent dull films are often obtainable. However, the method is not applicable to those classes of film-forming materials which cannot be precipitated and retain toughness of film. Furthermore, even with the best flat finishes of this type, the degree of flatness varies with the drying conditions, and uniform results cannot be obtained unless drying conditions are maintained absolutely uniform. Because of the difficulties involved in maintaining absolutely uniform drying conditions, this type of flat composition is used only in isolated instances.

The trade in general has adopted the use of powders which are relatively insoluble in the coating compositions, and which can be dispersed therein to yield films which are translucent because of the similarity in refractive index between the flatting agents and the film-forming solids, and are flat because of the fact that the insoluble flatting agents break up the light hitting the film. The flatting agents generally employed fall into two classes—organic flatting agents and inorganic transparent inerts.

The common organic flatting agents comprise certain transparent uncolored heavy metal soaps (magnesium, the alkali earths, zinc and aluminum soaps of fatty acids) and the waxes. These materials generally produce more transparent films than the inorganic flatting agents, since they are more nearly similar in refractive index to the film-forming agents. Furthermore, because of their low specific gravity, and because of their similarity in general constitution to the vehicles, they stay in suspension better, settling into flocculates which are easily stirred back into uniform dispersion. Because of these advantages, they have been preferred for transparent interior finishes and the like. They have, however, certain marked disadvantages. While they do not break up a film as badly as the inerts, films containing these agents also show crazing when flexed, as on artificial leather, except in the case of the most soluble soaps, which are extremely difficult to handle. Certain of the soaps hydrolyze when the films are exposed to water, causing an objectionable whitening of the film. Finally, the waxes and soaps are all more or less soluble in hydrocarbon solvents, particularly at elevated temperatures; improper milling, resulting in high temperature, will cause loss of flatting power; and these flat materials cannot be used in finishes designed to be dried at elevated temperatures.

The common inorganic inerts are siliceous materials such as infusorial earth, silica, silica gel, some talcs, etc. They are essentially pigments of high specific surface, which yield translucent films because their refractive indices approach those of the vehicles, and are capable of producing effective flatting because of their high specific surface. Unlike the soaps, they give no solubility difficulties, and do not show water-susceptibility. They have, however, three principal disadvantages. First, they are never as transparent as desired when a film of very low reflectivity is wanted. Second, they settle very badly, to hard dry cakes which stir in with difficulty; this appears to be a property associated with their particle size and shape. Finally, the films produced are essentially pigmented films, so that where high flexibility is desired, as in artificial leather, the films are unsatisfactory because they craze on flexing.

I have discovered that certain alkaline-reacting precipitated hydrated calcium silicates of extremely fine particle size (under 1 micron), make excellent flatting agents for organic liquids, having marked advantages over conventional inorganic flatting agents in that the flatting agent stays in suspension well, and yields films with marked superiority in flexibility and toughness as compared with films prepared from other inorganic flatting agents.

A typical product of this type is sold under the trade name "Silene," and comprises a hydrated precipitated silicate analyzing about 18% CaO, 64% $SiO_2$, 15% loss on ignition (combined water), and a small percentage of free water and impurities; it has a pH of about 10 in water suspension. This product is sold in the dry form as an agglomerated powder, which on milling into a finish yields a dispersion of particles substantially under 1 micron in size.

Typical formulae are the following:

EXAMPLE 1

*Flat wood lacquer*

6.0% flatting agent as described above
12.0% ½ sec. R. S. nitrocellulose (containing 30% alcohol)
6.0% dewaxed damar
4.0% tricresyl phosphate
72.0% solvent comprising—
    60% toluene
    10% ethyl alcohol
    20% butyl acetate
    10% butanol This is an excellent flat wood lacquer. The flatting agent is dispersed in a pebble mill.

EXAMPLE 2

*Flat varnish*

7.0% flatting agent as described above
15.0% rosin-modified phenol aldehyde resin
10.0% China-wood oil
68.0% petroleum naphtha (B. R. 150–200° C.)

A varnish is prepared by cooking the resin and oil together to a medium body, and thinning to 50% solids with the naphtha. The flatting agent is dispersed in a portion of the varnish, and the finished composition is made by reducing the paste.

This flatting agent is particularly useful in baking finishes, since the agent is completely insoluble. Thus—

EXAMPLE 3

*Baking finish*

7.0% flatting agent as above
17.5% 35% soya oil modified glycerol phthalate alkyd resin
17.5% solvent-soluble urea formaldehyde resin dissolved in—
10.0% butanol
8.0% xylene
40.0% Solvesso #2 (hydrogenated petroleum naphtha—B. R. 135–177° C.)

The flatting agent is dispersed in a solution of the alkyd resin in the Solvesso.

EXAMPLE 4

*Artificial leather top coat*

4.0% flatting agent as above
10.5% 5 to 6 sec. R. S. nitrocellulose
13.5% bodied castor oil
72.0% solvent, comprising—
    50% alcohol
    45% ethyl acetate
    5% butyl acetate This gives a fairly flexible, reasonably dull, top coat for artificial leather, which crazes very much less than the top coats made with other inorganic flatting agents.

Other film-forming agents can be used to replace those indicated, including drying oils, other cellulose esters, cellulose ethers, various air-drying synthetic resins such as alkyds, vinyl, acrylate, and styrene resins. The various heat-convertible resins (carbamide-aldehyde, phenol-aldehyde, short oil alkyds) are unusually good vehicles, yielding very tough dull baked finishes. In general all hydrophobic film-forming agents used in the preparation of flat finishes may be used.

Obviously, examples can be multiplied indefinitely without departing from the scope of my invention, as defined in the claims.

I claim:

1. A film-forming composition capable of producing a clear dull finish comprising a liquid film-forming vehicle capable of producing a hydrophobic film, and as substantially the sole pigment constituent a small percentage of a hydrated calcium silicate distributed therein in particles of an average size below about 1 micron, and containing about 18% CaO, 64% $SiO_2$, and 15% combined water.

2. The composition of claim 1, in which the film-forming vehicle is a nitrocellulose lacquer.

3. The composition of claim 1, in which the film-forming vehicle is a heat-convertible synthetic resin varnish.

WILLIAM A. WEIDLICH.